United States Patent
Rapoport

(10) Patent No.: US 11,029,413 B1
(45) Date of Patent: Jun. 8, 2021

(54) USING SDP RELAXATION FOR OPTIMIZATION OF THE SATELLITES SET CHOSEN FOR POSITIONING

(71) Applicant: Topcon Positioning Systems, Inc., Livermore, CA (US)

(72) Inventor: Lev Borisovich Rapoport, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 0 days.

(21) Appl. No.: 16/088,518

(22) PCT Filed: Apr. 18, 2018

(86) PCT No.: PCT/RU2018/000241
§ 371 (c)(1),
(2) Date: Sep. 26, 2018

(87) PCT Pub. No.: WO2019/203678
PCT Pub. Date: Oct. 24, 2019

(51) Int. Cl.
*G01S 19/28* (2010.01)
*G01S 19/33* (2010.01)
(Continued)

(52) U.S. Cl.
CPC ............. *G01S 19/28* (2013.01); *G01S 19/29* (2013.01); *G01S 19/30* (2013.01); *G01S 19/33* (2013.01); *G01S 19/258* (2013.01)

(58) Field of Classification Search
CPC ........ G01S 19/28; G01S 19/33; G01S 19/258; G01S 19/29; G01S 19/30
See application file for complete search history.

(56) References Cited

U.S. PATENT DOCUMENTS

| 5,471,217 A | * 11/1995 | Hatch ................... G01S 19/426 342/357.27 |
| 5,914,685 A | 6/1999 | Kozlov et al. |
| (Continued) |

FOREIGN PATENT DOCUMENTS

WO    2011041430 A1    9/2017

OTHER PUBLICATIONS

Liu et al. ("GDOP Minimum in Multi-GNSS Positioning"). Advances in Space Research 60 (2017). 1400-1403. (Year: 2017).*

(Continued)

*Primary Examiner* — Gregory C. Issing
(74) *Attorney, Agent, or Firm* — Bardmesser Law Group

(57) ABSTRACT

A method of determining coordinates, including receiving GNSS (global navigation satellite system) signals from at least five satellites, wherein at least two of the five satellites belong to one constellation, and the remaining satellites belong to at least one other constellation; processing the GNSS signals to measure code and phase measurements for each of the satellites and each of the GNSS signals; selecting a subset of the GNSS signals as an optimal set for coordinate calculation, where the selecting is based on Semi-Definite Programming (SDP) relaxation as applied to an optimization of a PDOP (positional dilution of precision) criterion; calculating coordinates of a receiver based on the code and phase measurements of the selected subset; and outputting the calculated coordinates. The total number of signals in the optimal set should not exceed the predefined number of m signals.

16 Claims, 3 Drawing Sheets

(51) Int. Cl.
  *G01S 19/30* (2010.01)
  *G01S 19/29* (2010.01)
  *G01S 19/25* (2010.01)

(56) References Cited

U.S. PATENT DOCUMENTS

| | | | |
|---|---|---|---|
| 7,460,976 B2 * | 12/2008 | Ye | .......................... H04W 64/00 |
| | | | 702/150 |
| 7,764,226 B1 * | 7/2010 | Veitsel | ..................... G01S 19/33 |
| | | | 342/357.73 |
| 2009/0273511 A1 | 11/2009 | Schroth | |

OTHER PUBLICATIONS

Blanco-Delgado et al ("Satellite Selection Method for Multi-Constellation GNSS Using Convex Geometry"). IEEE Transactions on Vehicular Technology, vol. 59, No. 9. Nov. 2010. pp. 4289-4297. (Year: 2010).*
Nie et al ("A New Method for Satellite Selection with Controllable Weighted PDOP Threshold"). Survey Review. 49:355, 285-293, DOI:10.1080/00396265.2016.1171959. May 2016. (Year: 2016).*
Teng et al ("A Closed-Loop Formula to Calculate Geometric Dilution of Precision (GDOP) for Multi-GNSS Constellations"). GPS SOlutions (2016). 20:331-339. (Year: 2016).*
Search Report in PCT/RU2018/000241, dated Dec. 20, 2018.

* cited by examiner

USING SDP RELAXATION FOR OPTIMIZATION OF THE SATELLITES SET CHOSEN FOR POSITIONING

BACKGROUND OF THE INVENTION

Field of the Invention

The present invention relates to satellite navigation systems, and, more particularly, to determination of a subset of satellites, out of many available ones, that are to be used for accurate calculation of position.

Description of the Related Art

When processing multiple navigation satellite systems, including GPS, GLONASS, Galileo, Beidou, QZSS, the overall number of the range and carrier phase signals can exceed several tens (close to 100 today, and more are expected in the future). On the other hand, a much smaller number of them is necessary for processing to meet sufficient precision of positioning. Some parts of RTK algorithms, like carrier phase ambiguity resolution, are very sensitive to the dimension of the integer search problem. If trying to process multiple satellite signals, it is very important to correctly choose the subset of carrier phase ambiguities that are fixed first, secondarily, and so on.

Assume that the receiver connected to each antenna or multi-antenna receiver connected to plurality of antennas is capable of receiving multiple GNSS signals of multiple GNSS satellites, including (but not limited by this set)

GPS L1, L2, L5;
Galileo L1, L2, E5a, E5b;
QZSS L1, L2, L5, E6;
GLONASS L1, L2, L3;
BEIDOU B1, B2, B3.

The number of signals is actually larger than the number of satellites, because multiple frequency bands can be used for each satellite. The total number of signals can exceed dozens and even reach a value of a hundred.

The following fundamental set of observables is used:

$$P_{k,b}^s(t) = \rho_k^s(t) + cdt_k(t) - cdt^s(t) + \quad (1)$$
$$\left(\frac{f_{L1}^s}{f_b^s}\right)^2 I_{k,L1}^s(t) + T_k^s(t) + d_{k,b,P}^s + M_{k,b,P}^s - D_{b,P}^s + \varepsilon_{k,b,P}^s(t)$$

$$\varphi_{k,b}^s(t) = \frac{f_b^s}{c}\rho_k^s(t) + f_b^s dt_k(t) - f_b^s dt^s(t) + N_{k,b}^s(t_{CS,k,b}^s) - \quad (2)$$
$$\frac{1}{c}\frac{(f_{L1}^s)^2}{f_b^s} I_{k,L1}^s(t) + \frac{f_b^s}{c} T_k^s(t) + d_{k,b,\varphi}^s + M_{k,b,\varphi}^s - D_{b,\varphi}^s + \varepsilon_{k,b,\varphi}^s$$

where the following notations are used (see [3, Chapter 6, 7]):

k is the index of the receiver stations;
s is the number of the satellite (out of S total satellites from which signals are received). It is assumed that all satellites available for tracking by the antenna k are ordered and this ordering number includes the satellite system. For example, satellites with numbers from 1 to 32 are GPS, satellites with numbers from 33 to 56 are GLONASS, satellites with numbers from 57 to 88 are BEIDOU, etc. although this numbering scheme is more for convenience than due to any fundamental physical limitation;
b is the frequency band (for example L1, LP2, L2C, L5, E6, B1, and so on);
(s,b) the pair of indices indicating the signal of the satellites at the frequency band b;
t is the current time; the term "epoch" is also used to denote the current discrete time instant;
c is the speed of light;
$f_b^s$ is the frequency of the signal corresponding to the satellite s and the frequency band b;
$dt_k(t)$ is the current clock bias of the station k;
$d^s(t)$ is the current clock bias of the satellite s;
$I_{k,b}^s(t)$ is the ionospheric delay affecting the signal {s,b} received by the station k. Thus $I_{k,L1}^s(t)$ is related to the L1 band. Basically, the ionospheric delay depends on the position of the station, position of the satellite, frequency of the signal, and the total electronic content (TEC) corresponding to the time instant t;
$T_k^s(t)$ is the tropospheric delay. In contrast to the ionospheric delay it doesn't depend on the signal frequency and is called "non-dispersive" delay.
$P_{k,b}^s(t)$ and $\varphi_{k,b}^s(t)$ are pseudorange and phase measurements respectively;
$M_{k,b,P}^s$ and $M_{k,b,\varphi}^s$ are code and phase multipath, affecting pseudorange and carrier phase measurements respectively;
$N_{k,b}^s(t_{CS,k,b}^s)$ is carrier phase ambiguity corresponding to the signal {s, b} received by the station k. Note that it corresponds to the last detected cycle slip and therefore it explicitly depends on the time instant $t_{CS,k,b}^s$, when the cycle slip was detected. The carrier phase ambiguity remains unchanged until the cycle slip occurs.
$\rho_k^s(t)$ is the true topocentric range between the satellite and the station. The measurement equations (1) and (2) relate this quantity with pseudorange and carrier phase observables, respectively;
Quantities $D_{b,\varphi}^s$, $D_{b,P}^s$, $\varepsilon_{k,b,P}^s(t)$ and $\varepsilon_{k,b,\varphi}^s$ and denote hardware biases and noise. D stands for satellite-related bias, while d denotes the receiver-related bias. Biases reflect a systematic hardware component of the measurement error. Due to their physical nature biases are constant or slow varying, in contrast to the noise component of the error having the stochastic nature. Satellite position error is part of the slow varying bias. It is also called "the ephemerides" error.

Thus, the receiver position is measured by the pseudorange and carrier phase observables for the plurality of satellites. Error components, including biases and noise, affecting the observable equations (1) and (2), prevent a direct solution for the receiver antenna position.

Carrier phase measurements are much more precise, compared to the pseudorange measurements, since the carrier phase noise has standard deviation in the centimeter or even millimeter range, while the standard deviation of the pseudorange measurements is usually of the meter or decimeter range. On the other hand, the carrier phase measurement is affected by the carrier phase ambiguity, which is an unknown integer valued quantity.

Thus, elimination of measurement errors is necessary for precise positioning. To achieve a high precision in position determination, different methods of errors mitigation are applied. For example, tropospheric errors can be precisely modeled and compensated in observables of equations (1) and (2). Ionospheric errors can be estimated along with other unknowns. Noise is easily filtered.

Errors common to two receivers, like clock and hardware biases of the satellite, can be compensated in a difference between two receivers. Usually one of receivers occupies a known position, while an antenna of another receiver is attached to the object to be located. The first receiver is called "the base" while another receiver is called "the rover". The processing mode involving calculation of the across-receiver difference (also called the "first difference") is referred to as differential GNSS processing or DGNSS. The DGNSS processing is performed in real time and includes not only pseudoranges but also carrier phase observables, and is referred to as real time kinematic (RTK) processing.

Another sources of errors partially eliminated by across-receiver differences are ionospheric delay and ephemerides error. The closer the rover is to the base, the better is compensation of the ionospheric and ephemerides error.

For two stations k and l the across-receiver differences of pseudorange and carrier phase measurements can be written as $$\overline{P}^s_{kl,b}(t) = \rho^s_k(t) - \rho^s_l(t) + cdt_{kl}(t) + \left(\frac{f^s_{L1}}{f^s_b}\right)^2 I^s_{kl,L1}(t) + d_{kl,b,P} + \varepsilon^s_{kl,b,P}(t), \quad (3)$$

$$\overline{\varphi}^s_{kl,b}(t) = \frac{1}{\lambda^s_b}(\rho^s_k(t) - \rho^s_l(t)) + f^s_b dt_{kl}(t) +$$
$$N^s_{kl,b}(t^s_{CS,kl,b}) - \frac{1}{\lambda^s_b}\left(\frac{f^s_{L1}}{f^s_b}\right)^2 I^s_{kl,L1}(t) + d^s_{kl,b,\varphi} + \varepsilon^s_{kl,b,\varphi}, \quad (4)$$

Another way for error mitigation includes using a precise satellite clock and precise ephemerides. They are available through a dedicated real time service. Precise point positioning (PPP) allows to achieve the centimeter level position with only one rover receiver, provided satellite clock and precise satellite position are available. The base station is not necessary in this case.

Finally, if neither base station, nor precise clock and ephemerides are available, the quality of the standalone position can be improved if carrier phase ambiguity and ionospheric delay are estimated, along with position, using broadcast ephemerides. The corresponding processing mode is equivalent smoothing of pseudoranges using carrier phase measurements or, in short, carrier phase smoothing of code pseudoranges, see [2]. Whatever processing mode is used, the linearization and filtering algorithms are used for recursive estimation of unknown position, carrier phase ambiguity, and ionospheric delay.

The general form of the linearized navigation model has the following form (see [2, Chapt. 7])

$$b_P(t) = Adx(t) + e\xi(t) + \Gamma i(t) + d_P \quad (5)$$

$$b_\varphi(t) = \Lambda^{-1} Adx(t) + \Lambda^{-1} e\xi(t) + n - \Lambda^{-1}\Gamma i(t) + d_\varphi \quad (6)$$

Two last quantities are undifferences for carrier phase smoothing and PPP processing modes. For DGNSS and RTK processing modes the carrier phase ambiguity and ionospheric delay are across-receiver differenced.

Let M be total number of satellite signals, including different satellite systems, different satellites, different frequency bands.

In the following description, all vectors are represented by columns, and the superscript symbol $^T$ denotes the matrix transpose. $R^N$ is the N-dimensional Euclidean space. Given a linearization point $x_0(t) \in R^3$, notations used in equations (5) and (6) are as follows:

$b_P(t) \in R^M$ is the M-dimensional vector of pseudorange residuals calculated at the linearization point;

$b_\varphi(t) \in R^M$ is the M-dimensional vector of carrier phase residuals calculated at the linearization point;

$e = (1, 1, \ldots, 1)^T \in R^M$ is the vector consisting of all "ones";

$dx(t) \in R^3$ is the correction to the linearization point. Thus, the corrected position is calculated as $x(t) = x_0(t) + dx(t)$;

$\xi(t)$ is the arbitrary varying rover clock shift; it is undifferenced for the standalone and PPP processing modes, and it is across-receiver differenced in the DGNSS and RTK processing modes;

$\Lambda$ is the M-dimensional diagonal matrix with wavelengths $\lambda^s_b = c/f^s_b$ in the main diagonal. Each wavelength corresponds to the specific signal (s,b);

A is the M×3 matrix of directional cosines;

$\Gamma$ is the M×M diagonal matrix with quantities $(f^s_{L1}/f^s_b)^2$ in the main diagonal;

$i(t) \in R^S$ is the vector of ionospheric delays related to the L1 frequency band. Ionospheric delays are undifferenced for the standalone and PPP processing modes, and they are across-receiver differenced in the DGNSS and RTK processing modes;

$n \in R^M$ is the vector of carrier phase ambiguities related to the L1 frequency band. Ambiguities are undifferenced for the standalone and PPP processing modes, and they are across-receiver differenced in the DGNSS and RTK processing modes;

$d_P \in R^M$ and $d_\varphi \in R^M$ are vectors of pseudorange and carrier phase receiver hardware biases.

Consideration of pseudorange hardware biases leads to a necessity to consider the plurality of signals the receiver is able to track. In the case of a multi-frequency and multi-system receiver supporting the following bands:

L1, L2 and L5 bands for GPS,
L1 and L2 GLONASS,
L1, E5a, E5b and E6 Galileo,
L1, L2, L5 and E6 QZSS,
L1 an, L5 SBAS,
B1, B2, and B3 Beidou, the signals (L1 GPS, L1 Galileo, L1 SBAS, L1 QZSS), (L2 GPS, L2 QZSS), (L5 GPS, E5a Galileo, L5 SBAS, L5 QZSS), (E6 Galileo, E6 QZSS), respectively, can share the same hardware channel and therefore will be affected by the same hardware bias, as noted in [2, Chapter 7]. Note that the biases vector $d_P$ and the clock shift variable $\xi(t)$ appear as a sum in equation (5). This means that one of the biases, say $d_{L_1,G/E/S/Q,P}$, can be combined with $\xi(t)$, while others can be replaced with their difference with $d_{L_1,G/E/S/Q,P}$. Thus, new bias variables appear:

$$\eta_1 = d_{L_2,G/Q,P} - d_{L_1,G/E/S/Q,P}, \, \eta_2 = d_{L_1R,P} - d_{L_1,G/E/S/Q,P},$$
$$\eta_3 d_{L_2,R,P} - d_{L_1,G/E/S/Q,P}$$

$$\eta_4 = d_{L_5,G/E/S/Q,P} - d_{L_1,G/E/S/Q,P}, \, \eta_5 = d_{E_{5b},E,P} - d_{L_1,G/E/S/Q,P}, \, \eta_6 = d_{E_6,E/Q,P} - d_{L_1,G/E/S/Q,P}$$

$$\eta_7 = d_{B_1,B,P} - d_{L_1,G/E/S/Q,P}, \, \eta_8 = d_{B_2,B,P} - d_{L_1,G/E/S/Q,P},$$
$$\eta_9 = d_{B_3,B,P} - d_{L_1,G/E/S/Q,P} \quad (7)$$

This representation can be referred to as establishing a bias datum.

In one possible embodiment, the linearized equations (5) can now be expressed in the form $$b_P(t) = Adx(t) + e\xi(t) + \Gamma i(t) + W_\eta \eta \quad (8)$$

The bias vector $\eta$ has the appropriate dimension $m_\eta$. Note again that in this exemplary embodiment we follow notations introduced in [2], which is incorporated herein by reference in its entirety.

The bias vector $\eta$ is three-dimensional ($m_\eta = 3$) for dual-band and dual-system GPS/GLONASS receivers, as only biases $\eta_1$, $\eta_2$, $\eta_3$ are presented among all possible biases listed in (7). In the case of the multi-band, multi-system receiver, the dimension of the vector $\eta$ can be large. It is one-dimensional in the case of dual-band GPS-only receivers or single band GPS/GLONASS receivers.

The $W_\eta$ is referred to as bias allocation matrix and has dimensions $n \times m_\eta$. It allocates a single bias, or none, to a certain signal. No bias is allocated to the signal corresponding to the GPS, Galileo, SBAS, or QZSS systems and b=L1 because we combined the bias $d_{L_1,G/E/S/Q,P}$ with the clock bias $\xi(t)$. In this case, the row of $W_\eta$ consists of zeroes.

Consider, for example, a dual-band GPS/GLONASS receiver. Suppose it tracks six GPS satellites and six GLONASS satellites. The total number of dual-band signals is 24. Let the signals be ordered in the following way: six GPS L1, six GPS L2, six GLONASS L1, and six GLONASS L2 signals. The biaseallocation matrix W presented in the linearized single difference pseudorange equation (8) takes the following form:

$$W_\eta^T = \begin{bmatrix} 0 & 0 & 0 & 1 & 1 & 1 & 0 & 0 & 0 & 0 & 0 & 0 \\ 0 & 0 & 0 & 0 & 0 & 0 & 1 & 1 & 1 & 0 & 0 & 0 \\ 0 & 0 & 0 & 0 & 0 & 0 & 0 & 0 & 0 & 1 & 1 & 1 \end{bmatrix} \quad (9)$$

Further, the real-valued carrier phase ambiguities (also called float ambiguities) are combined with biases $d_\varphi$, while pseudorange biases are considered as a real valued constant unknown parameter. Thus, after combination of carrier phase ambiguities with carrier phase biases, the equation (6) takes the form $$b_\varphi(t) = \Lambda^{-1} A d x(t) + \Lambda^{-1} e \xi(t) + n - \Lambda^{-1} \Gamma i(t). \quad (10)$$

Note that the noise component is omitted in equations (8), (10) for the sake of brevity.

The ambiguity vector n and the bias vector $\eta$ are further recursively estimated based on successively processed set of data (8) and (10) for successive time epochs t. Ambiguity vector is then fixed at the integer valued-vector called fixed ambiguity n*. Both recursive estimation and especially integer search are computationally consuming. Computational cost of recursive estimation cubically depends on M. Even more computationally excessive (actually near exponential) is the integer search. On the other hand not all signals are necessary for accurate position determination.

Accordingly, there is a need in the art for a technique for selecting a set of GNSS signals for use in all modes of positioning.

SUMMARY OF THE INVENTION

Accordingly, the present invention is directed to optimal selection of satellites to be used for accurate precision of positioning in the following processing modes:

In one aspect, there is provide a method of determining coordinates, including receiving GNSS (global navigation satellite system) signals from at least five satellites, wherein at least two of the five satellites belong to one constellation (e.g., GPS), and the remaining satellites belong to at least one other constellation (e.g., to Galileo); processing the GNSS signals to measure code and phase measurements for each of the satellites and each of the GNSS signals; selecting a subset of the GNSS signals as an optimal set for coordinate calculation, where the selecting is based on Semi-Definite Programming (SDP) relaxation as applied to an optimization of a PDOP (positional dilution of precision) criterion; calculating coordinates of a receiver based on the code and phase measurements of the selected subset; and outputting the calculated coordinates. The total number of signals in the optimal set should not exceed the predefined number of m signals.

Optionally, the receiver is a standalone receiver, or operates in a smoothed standalone mode, or operates in a differential mode. Optionally, the SDP relaxation minimizes a linear criterion $$\min_{S,X} tr(S)$$

subject to linear matrix inequality constraint $$P(S, X) = \begin{pmatrix} A^T X A & I_p \\ I_p & S \end{pmatrix} \succeq 0,$$

and algebraic inequality constraints $$\sum_{i=1}^{M} x_i \leq m, \ 0 \leq x_i \leq 1,$$

where p is a number of navigation parameters, $$X = \begin{pmatrix} x_1 & 0 & \ldots & 0 \\ 0 & x_2 & \ldots & 0 \\ \ldots & \ldots & \ldots & \ldots \\ 0 & 0 & \ldots & x_M \end{pmatrix}$$

is a diagonal matrix composed of $x_i$,

S is a symmetric auxiliary matrix, m is the maximum number of signals allowed in the optimal set, $I_p$ is an identity matrix, and $\succeq$ stands for positive semidefiniteness.

Optionally, the $x_i$ are non-binary, and are rounded to 0 or 1.

Optionally, the SDP relaxation is used for computation of a lower bound by using a Branch and Bound technique.

Thus, the optimal choice problem is reduced to the convex optimization using semidefinite programming (SDP) relaxation approach. Within this approach the linear objective function is optimized over the cone of positive semidefinite matrices.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings comparison of optimal and non-optimal constellation choices is illustrated:

FIG. 1 illustrates an example of non-optimal selection of constellations of 9 satellites from a total 19 satellites available. The constellation is shown in the coordinate frame 'X,Y', where the axis 'X' is for the quantity 'elevation angle*sin(azimuth)'. The axis 'Y' is for the quantity 'elevation angle*cos(azimuth)'. Both quantities are measured in degrees from −90 to +90. Each satellite is denoted as a point in this coordinate frame.

DETAILED DESCRIPTION OF EMBODIMENTS OF THE INVENTION

Reference will now be made in detail to the embodiments of the present invention.

To reduce the computational cost of the positioning calculation, the optimal choice of signals should be used. Semi-definite relaxation (SDP) approach to solution of this optimization problem is proposed in this invention. Different cost functions controlling precision of positioning, for example PDOP, can be considered in the optimization problem. The constraint used in optimization includes the total number of signals. We must choose the subset whose total number does not exceed a given value (e.g., 19, or 24) in such a way that PDOP takes minimal possible value.

The optimization problem falls into class of binary optimization problems which are NP hard and therefore their precise solution assumes exponential computational complexity. To make solution more computationally tractable, the convex real valued relaxation is proposed. In the proposed approach, the problem is reduced to the convex optimization using semidefinite programming (SDP) relaxation approach. Within this approach the linear objective function is optimized over the cone of positive semidefinite matrices. This approach is attractive because of its generality, although it has never been applied to this specific application before.

Many problems of operation research, control and systems theory can be efficiently reduced to SDP. For convex optimization there are efficient fast computational algorithms with polynomial complexity which can be implemented in real time, see [1]. Most algorithms are based on interior point barrier functions method. There are robust packages, like SeDuMi, SDPT3 and SDPA, some of which are available in Linux as libraries, and which can be used in real time.

The quantity subject to optimization is known as positioning dilution of precision (PDOP) and is defined as $$tr(A^T A)^{-1} \quad (11)$$

where A stands for the matrix of the linearized system, for example (10). For different problems the matrix A can be chosen different ways.

Figure 1:
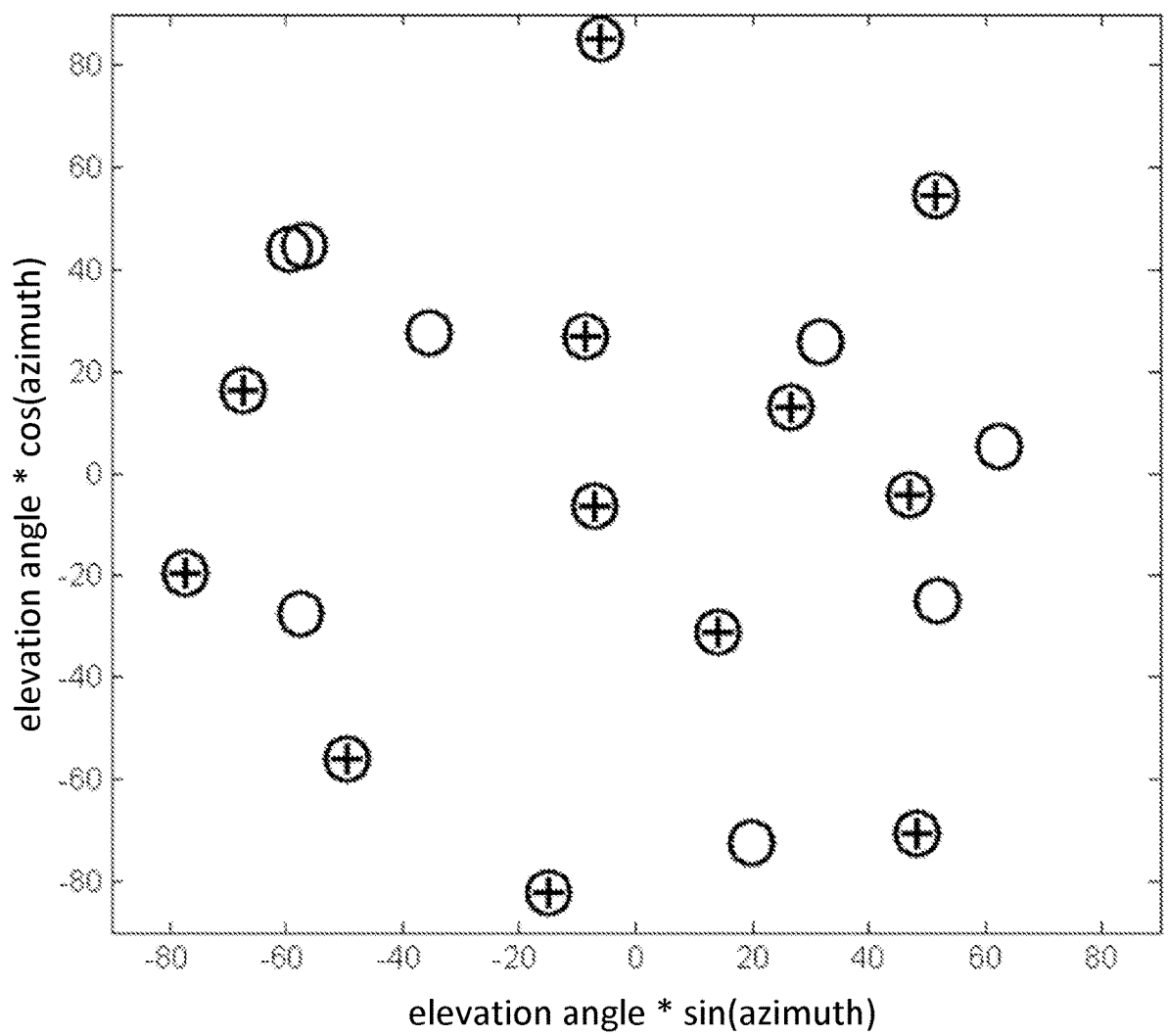
Figure 2:
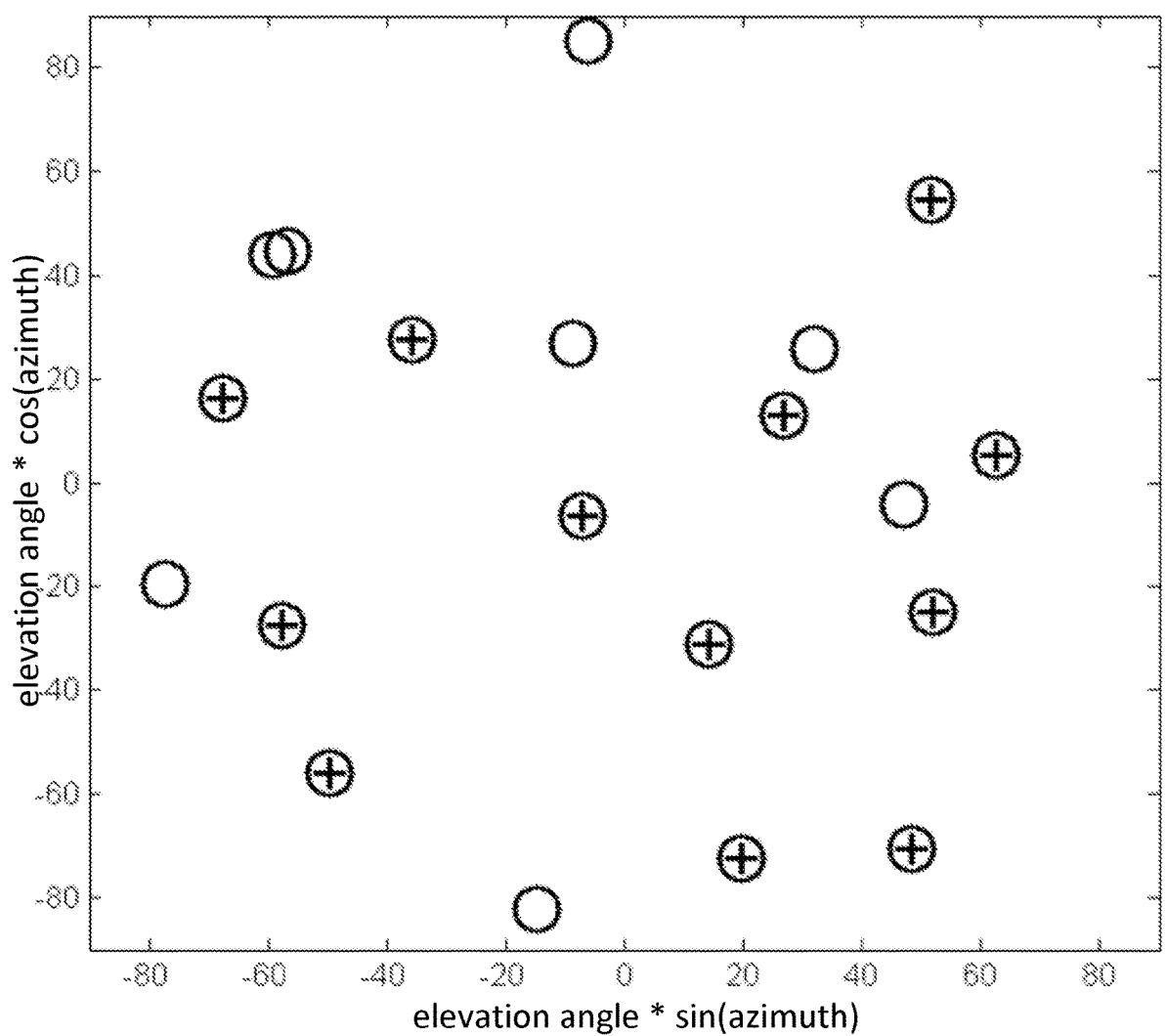
FIG. 2 illustrates the optimal choice for the same example as in FIG. 1. The same notations are used as in the FIG. 1.

Given the matrix A of directional cosines, with M being the total number of signals (19 in the example presented in FIGS. 1, 2), m the number of signals to be processed (9 in the example), $x_1$ the variable indicating if the signal is chosen, $X = \mathrm{diag}(x_1, \ldots, x_M)$, the optimization problem looks like:

$$tr(A^T X A)^{-1} \to \min \quad (12)$$

subject to constraints $$\sum_{i=1}^{M} x_i \leq m, \, x_i = 0, 1. \quad (13)$$

Here $\mathrm{diag}(x_1, \ldots, x_M)$ means a diagonal matrix with variables $x_i$ taking values 0 or 1. The maximum number of signals allowed in the optimal set is denoted by m.

The optimization problem (12), (13) is non-convex and binary. Its precise solution assumes exhaustive search, which is computationally hard. In the present invention, convex relaxation is proposed, which solves the linear cost function under semi-definite constraints as suggested below:

$$\min_{S,X} tr(S) \quad (14)$$

subject to constraints $$S = S^T, \quad (15)$$

$$P(S, X) = \begin{pmatrix} A^T X A & I_p \\ I_p & S \end{pmatrix} \succeq 0, \quad (16)$$

$$\sum_{i=1}^{M} x_i \leq m, \, 0 \leq x_i \leq 1, \quad (17)$$

where p is the number of navigation parameters. In one embodiment it can be 5 (x, y, z, Δt's). The notation $I_p$ stands for identity matrix, the symbol $\succeq$ stands for positive semidefiniteness of matrices.

The inequality (16) is known as linear matrix inequality (LMI) and establish convex constraints on the matrix which is linearly dependent on unknowns X, S. Thus, we reduced the optimal choice problem to the convex optimization problem for which there are very efficient numerical algorithms, see [1].

Possible algorithms include:

Ellipsoid method,

Path-following method for −log det (.) barrier functions.

These and others algorithms are available in the art for engineers.

After relaxed problem (14)-(17) is solved, the real valued estimates of binary variables $x_i^*$ are obtained which are subject to further rounding to nearest 0 or 1.

The relaxed problem can be used for calculation of the lower estimates together with Branch and Bound algorithm [4] for precise solution. This idea was illustrated by practical computations.

The SDP relaxation algorithm can be implemented and used for both batch processing and real time for L1 only and L1/L2/L5/G1/G2/B1/B2 multi-constellation multi-band signal processing.

Figure 3:
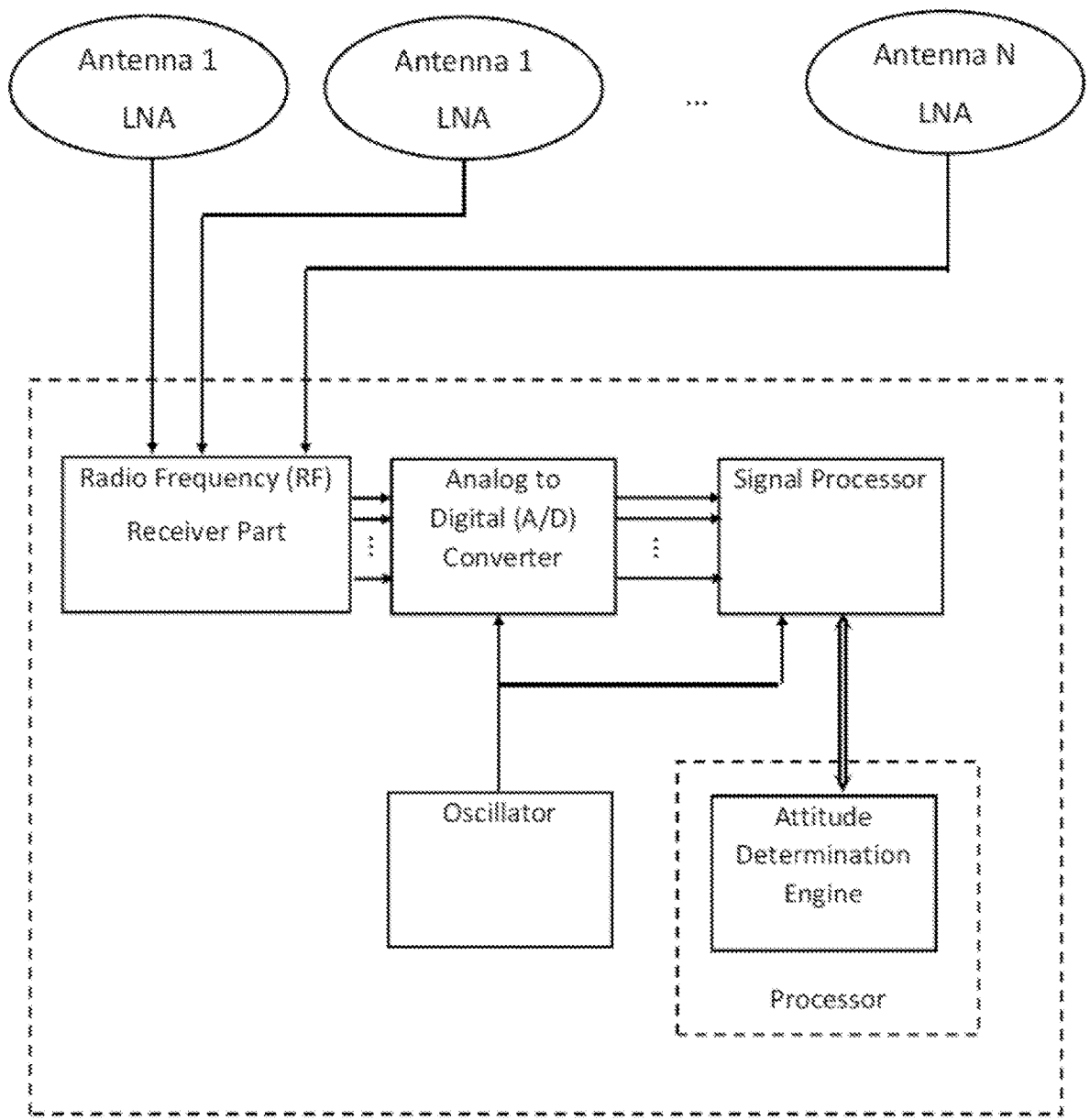
FIG. 3 shows a structure of an exemplary navigation receiver.

A structure of the navigation receiver that can be used in the invention is shown in FIG. 3. The antenna (or multiple antennas) is connected to the receiver consisting among others of the radio frequency (RF) part. RF signals are convolved with reference signals generated by the numerically controlled oscillator and digitized by A/D converter. Result of convolution is used for multiple signal tracking. Multiple signals corresponding to plurality of satellites and multiple frequency bands are used for coordinate determination. The processor runs signal tracking and coordinate determination algorithms.

Having thus described the different embodiments of a system and method, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

REFERENCES (ALL INCORPORATED HEREIN BY REFERENCE IN THEIR ENTIRETY)

1. Ben-Tal A., Nemirovski A., *Lectures on Modern Convex Optimization: Analysis, Algorithms, and Engineering Applications*, MOS-SIAM Series on Optimization, 2001.
2. A. Leick, L. Rapoport, D. Tatarnikov, *GPS Satellite Surveying*, Wiley & Sons, 2015.
3. Ning Wang, Liuqing Yang, *Semidefinite Programming for GPS*, II Proceedings of 24th International Technical Meeting of the Satellite Division of The Institute of Navigation, Portland, Oreg., Sep. 19-23, 2011.
4. Wolsey L. A., Nemhauser G. L., *Integer and Combinatorial Optimization*, John Wiley & Sons, 2014.

What is claimed is:

1. A method of determining coordinates, comprising:
receiving GNSS (global navigation satellite system) signals from at least five satellites, wherein at least two of the five satellites belong to one constellation, and the remaining satellites belong to at least one other constellation;
processing the GNSS signals to measure code and phase measurements for each of the satellites and each of the GNSS signals;
selecting a subset of the GNSS signals as an optimal set for coordinate calculation,
wherein the selecting is based on Semi-Definite Programming (SDP) relaxation as applied to an optimization of a PDOP (positional dilution of precision) criterion, wherein the SDP relaxation minimizes a linear criterion subject to a linear matrix inequality constraint;
calculating coordinates of a receiver based on the code and phase measurements of the selected subset; and
outputting the calculated coordinates.

2. The method of claim 1, wherein the receiver is a standalone receiver.

3. The method of claim 1, wherein the receiver operates in a smoothed standalone mode.

4. The method of claim 1, wherein the receiver operates in a differential mode.

5. The method of claim 1, wherein the linear criterion is $\min_{S,X} tr(S)$ and the linear matrix inequality constraint is $$P(S, X) = \begin{pmatrix} A^T X A & I_p \\ I_p & S \end{pmatrix} \succeq 0,$$

where A is an M by p matrix of linearized navigation equations, and subject to algebraic inequality constraints $$\sum_{i=1}^{M} x_i \leq m, \, 0 \leq x_i \leq 1,$$

where p is a number of navigation parameters, M is a total number of available signals, and $x_i$ is a variable indicating that satellite i is selected if $x_i=1$, $$X = \begin{pmatrix} x_1 & 0 & \ldots & 0 \\ 0 & x_2 & \ldots & 0 \\ \ldots & \ldots & \ldots & \ldots \\ 0 & 0 & \ldots & x_M \end{pmatrix}$$

is a diagonal matrix composed of $x_i$,
S is a symmetric auxiliary matrix,
m is the maximum number of signals allowed in the optimal set,
$I_p$ is an identity matrix, and
$\succeq$ stands for positive semidefiniteness.

6. The method of claim 5, wherein the $x_i$ are non-binary, and are rounded to 0 or 1.

7. The method of claim 5, wherein the SDP relaxation is used for computation of a lower bound by using a Branch and Bound technique.

8. A GNSS (global navigation satellite system) navigation receiver, comprising:
a plurality of radio frequency tracts receiving GNSS signals from at least five satellites, wherein at least two of the five satellites belong to one constellation, and the remaining satellites belong to at least one other constellation;
a digital section including a processor configured to process the GNSS signals to measure code and phase measurements for each of the satellites and each of the GNSS signals;
the processor configured to select a subset of the GNSS signals as an optimal set for coordinate calculation,
wherein the selecting is based on Semi-Definite Programming (SDP) relaxation as applied to an optimization of a PDOP (positional dilution of precision) criterion, wherein the SDP relaxation minimizes a linear criterion subject to a linear matrix inequality constraint;
the processor configured to calculate coordinates of a receiver based on the code and phase measurements of the selected subset; and
the processor configured to output the calculated coordinates.

9. The receiver of claim 8, wherein the receiver is a standalone receiver.

10. The receiver of claim 8, wherein the receiver operates in a smoothed standalone mode.

11. The receiver of claim 8, wherein the receiver operates in a differential mode.

12. The receiver of claim 8, wherein the linear criterion is $\min_{S,X} tr(S)$ and the linear matrix inequality constraint is $$P(S, X) = \begin{pmatrix} A^T X A & I_p \\ I_p & S \end{pmatrix} \succeq 0,$$

where A is an M by p matrix of linearized navigation equations, and subject to algebraic inequality constraints $$\sum_{i=1}^{M} x_i \leq m, \ 0 \leq x_i \leq 1,$$

where p is a number of navigation parameters, M is a total number of available signals, and $x_i$ is a variable indicating that satellite i is selected if $x_i=1$, $$X = \begin{pmatrix} x_1 & 0 & \ldots & 0 \\ 0 & x_2 & \ldots & 0 \\ \ldots & \ldots & \ldots & \ldots \\ 0 & 0 & \ldots & x_M \end{pmatrix}$$

is a diagonal matrix composed of $x_i$,

S is a symmetric auxiliary matrix, m is the maximal number of signals allowed in the optimal set, $I_p$ is an identity matrix, and $\succeq$ stands for positive semidefiniteness.

13. The receiver of claim 12, wherein the $x_i$ are non-binary, and are rounded to 0 or 1.

14. The receiver of claim 12, wherein the SDP relaxation is used for computation of a lower bound by using a Branch and Bound technique.

15. The receiver of claim 8, wherein the radio frequency tracts are connected to a single antenna.

16. The receiver of claim 8, wherein the radio frequency tracts are connected to multiple antennas.

* * * * *